United States Patent [19]

Hayashi

[11] Patent Number: 4,700,547
[45] Date of Patent: Oct. 20, 1987

[54] METHOD FOR INSTANTLY KILLING AND COOLING FISH, AND AN APPARATUS FOR CARRYING OUT THIS METHOD

[76] Inventor: Takeshi Hayashi, No. 85-3, Mitsuicho, Bezaiten, Muya-cho, Nuruto-shi, Tokushima-ken, Japan, 772

[21] Appl. No.: 849,676

[22] Filed: Apr. 9, 1986

[30] Foreign Application Priority Data

Apr. 25, 1985 [JP] Japan ................................. 60-090586
May 25, 1985 [JP] Japan ................................. 60-112996

[51] Int. Cl.4 ...................... F25D 13/04; F25D 17/02
[52] U.S. Cl. ........................................... 62/65; 62/373
[58] Field of Search .................. 114/255; 62/372, 373, 62/64, 371, 65

[56] References Cited

U.S. PATENT DOCUMENTS 4,341,091 7/1982 Minter ................................... 62/372
4,442,786 4/1984 Conners ............................. 114/255

Primary Examiner—Henry A. Bennet
Attorney, Agent, or Firm—Wenderoth, Lind & Ponack

[57] ABSTRACT

A method is provided for killing and preserving fish in a fresh state or a two stage procedure. In the primary or instant cooling stage, fish are killed instantly by the shock of emersion in a rapid cooling fluid. This fluid subjects the surface layer of each fish to a temperature below that at which they will be stored. In the secondary or storage stage, individual fish are either passively cooled on the inside by their low temperature surface layer, or else they are cooled inside and out by external means. An apparatus is also provided for this method and is comprised of the following: a rapid cooling hopper to deliver fish into the system, a primary rapid cooling tank to instantly kill fish, and a device connected to the primary rapid cooling tank to discharge fish to the secondary stage cold storage tank. Live fish are introduced to the system through the rapid cooling hopper, killed by the shock of instant cooling in the primary rapid cooling tank, and subsequently delivered to the secondary stage cold storage tank by the discharge device.

15 Claims, 9 Drawing Figures

METHOD FOR INSTANTLY KILLING AND COOLING FISH, AND AN APPARATUS FOR CARRYING OUT THIS METHOD

BACKGROUND OF THE INVENTION

The present invention relates to a method for instantly killing fish and at the same time cooling them so as to keep them very fresh for a long time.

A method for keeping fish very fresh by instantly killing them and for putting tasty fish on the market has been well known.

The prevent invention relates to a method for keeping the fish very fresh for a long time using a new method for instantly killing the fish.

More particularly, the present invention relates to a method for processing very fresh fish and frozen fish by instantly killing and effectively cooling a large quantity of abundantly available popular sea fish such as sardines, horse mackerel, mackerel and mackerel pike or popular freshwater fish from varieties such as salmon and sweetfish.

For a method for treating fish to keep them very fresh and tasty for a long time, especially important are:

(1) to make the fish die from shock in a short time without agony, and (2) to cool the fish rapidly in a short time preferably without freezing them because in a bad frozen state, the fish flesh is degraded.

In order to satisfy these conditions, high quality fish such as tunas, porgys and young yellowtails are instantly killed by stabbing the hindbrain in the head of the fish immediately after they are caught, and immediately cooled, for example, in ice water to preserve freshness.

In this process, unless the stab hits accurately the hindbrain of the fish, the fish is not instantly killed and it loses its commercial value. Therefore, in almost all cases, the fish are killed by human hand.

The fish treated by the method of the present invention are relatively small-sized popular fish which are caught a lot at a time. These fish can be hardly treated effectively in a short time by such a manual operation.

A lot of popular fish caught with a round haul net, a draw net or a fixed shore net are generally treated by the ice water method, transported immersed in the ice water to the fishing port and then landed with a landing net or by a water pump. The degree of freshness of the fish landed in such a manner varies widely from fish tank to fish tank. Besides, since the fish died with agony, copious bleeding from the gills or the body surface is observed, and the taste and thus the commercial value of the fish are lowered.

In order to research this, the inventor has observed in detail the lifting of the fish from net into the fish tank on. As a result, it has been observed that when the fish are thrown into the cooling sea water obtained by mixing sea water with crushed ice originally in the fish tank, they do not immediately die from shock but most of fish are leaping on the crushed ice and still alive for several minutes.

Live fish dipped into the cooling sea water die rather soon, but they are alive for several minutes in the cool water at a temperature of 0 degree C. + or − several degrees. In other words, the fish are in agony in the cooling water, and are not instantly killed from shock.

There was copious bleeding from the gills and body surface of the fish dying in agony and the ice water was colored dark-red when landed and their excrements and the like were observed in it.

In the body of the fish dying in agony and struggle, the muscles are convulsed or temporarily contract. At this time, a large amount of energy is wasted, and in the muscles, glycogen is decomposed to accumulate lactic acid. Therefore, the pH of the fish body is acidified and the heat generation due to the self-digestion of the fish causes the temperature to rise, whereby the freshness degradation in the early stage is remarkably promoted. Besides, the taste of the fish flesh becomes worse.

Further, though fish are cooled in ice water in the fish tank, the temperature of the ice water is uneven in parts, and the degree of freshness of the fish varies widely. It has been observed that all the fish cannot be uniformly cooled in a short time, and the temprature of a part of the fish rises to 4 degrees C. or 5 degrees C., and that in the case of the actively self-digesting fish such as walleye pollacks, the temperature of the inside part of the fish body rises as high as to 15 degrees C. even though there is ice on the water surface in the fish tank.

Unfortunately as the result, in the conventional art, it is very difficult to keep the nettable en masse popular fish in a flavorful and very fresh state for a long time.

In comparison with the large-sized high quality fish. the small-sized nettable en masse popular fish are especially apt to self-digest and to be degraded in freshness. Therefore, a more advanced art is required for keeping the popular fish fresh for a long time, in comparison with the case of the high quality fish.

The inventor has discovered that the fish, rapidly cooled by the generally used method of dipping the fish in the cool sea water mixed with freshwater ice (the ice water method), are put in agony for a much longer time than the case where they are instantly killed by stabbing their hindbrain.

While the fish stabbed in the hindbrain die at least within a few seconds, the fish cooled by the ice water method are in agony for a few minutes. The inventor has paid attention to the difference between the times until the fish die.

After that, the inventor has made an experiment. When living gray mullets and filefishs were thrown into ice water at a temperature of 0 degree C., it was obviously observed that the gray mullets and the filefishs were breathing and alive for 40 minutes and an hour respecteivly. Consequently, it has been confirmed that, according to the conventional way of instantly killing fish by the ice water method, the fish die not from rapid cooling but from suffocation due to oxygen starvation or the like caused by the throwing of a lot of fish into the fish tank.

BRIEF SUMMARY OF INVENTION

An object of the present invention to provide a method of instantly killing and cooling fish to obtain flavorful fish by effectively instantly killing and rapidly cooling them, and this is realized by providing a new apparatus for instantly killing and cooling the fish.

Another important object of the present invention is to provide a method for instantly killing and cooling fish, on board, for example, on a fishing ship, by which all the fish caught can be unifomly kept at a much higher degree of freshness for a much longer time than in the case of the conventional ice water method.

A further important object of the present invention is to provide a method for instantly killing and the cooling fish, by which method a lot of fish can be treated with a small amount of rapid cooling fluid though they are instantly killed and cooled with a rapid cooling fluid at a quite low temperature.

A further important object is to provide a method for instantly killing and cooling large quantities of nettable en masse popoular fish caught by fishing net or the like on the spot in a short time, and at the same time obtaining fish uniformly of a high degree of freshness.

A further object of the present invention is to provide a method for instantly killing and cooling fish, which method can be especially conveniently used on a fishing ship where due to the limitation of space, a large-sized freezing apparatus cannot be mounted and a large amount of rapid cooling fluid can hardly be prepared, and by using the method on a ship, living and healthy fish can be instantly killed and cooled whereby flavorful cooled fish can be obtained.

The above and further objects and novel features of the invention will more fully appear from the following detailed description is read in connection with the accompanying drawing. It is to be expressly understood, however, that the drawing is for purpose of illustration only and is not intended as a definition of the limits of the invention.

DETAILED DESCRIPTION

Now, preferred examples of the present invention will be described below with reference to the appended drawings.

Figure 1:
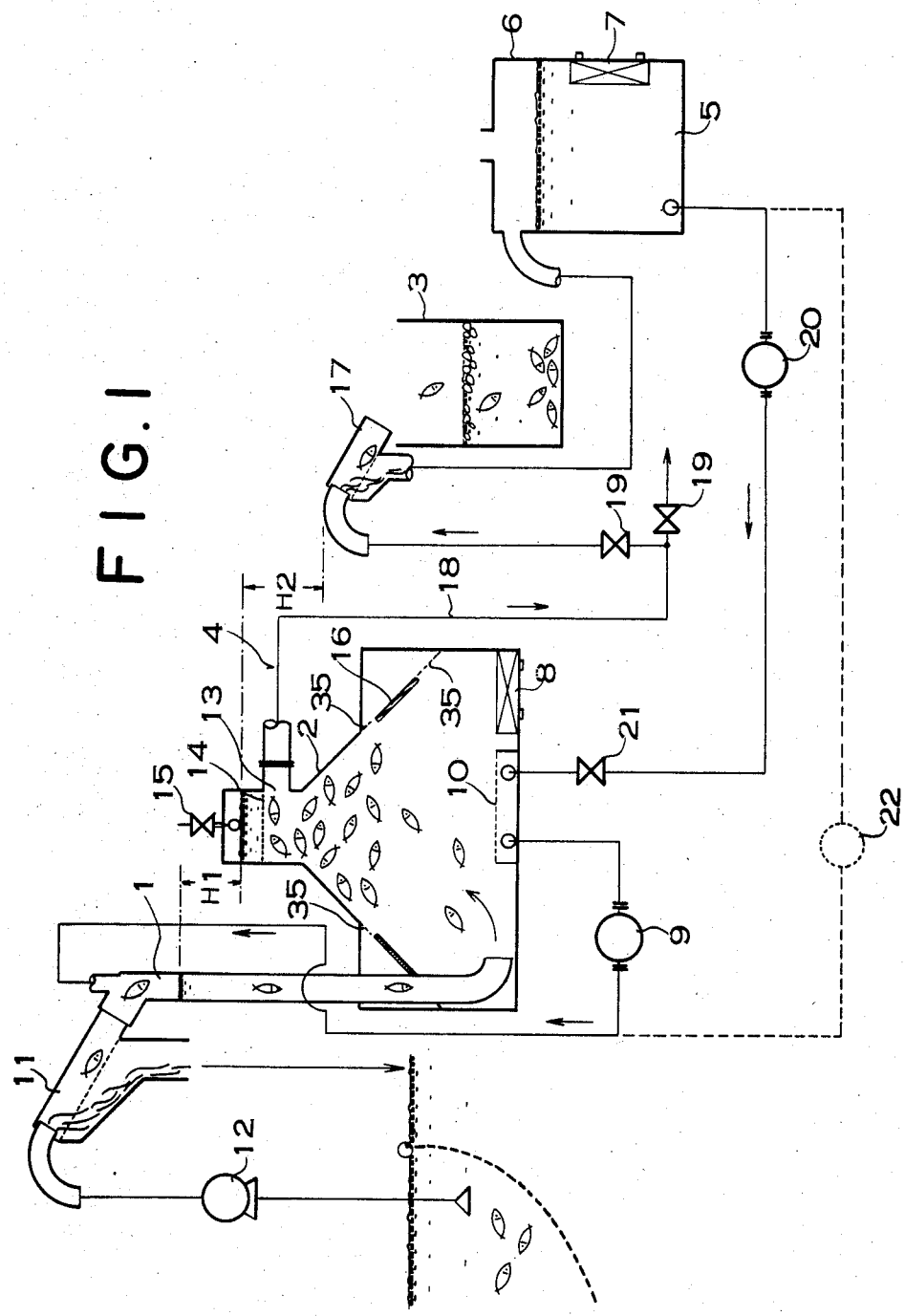
FIG. 1 through FIG. 4 and FIG. 6 through FIG. 9 are cross sectional drawings outlining actual implementations of the fish execution and cooling system proposed by this invention.

An apparatus for instantly killing and cooling living fish shown in FIG. 1 comprises a rapid cooling hopper 1 through which fish are fed, a rapid cooling tank 2 connected to the rapid cooling hopper 1 and adapted for killing and cooling the living fish so as to freeze the surface layer of the living fish, a discharge means 4 for transferring frozen fish out of the rapid cooling tank 2 to a cold storage tank (low temperature maintenance tank) 3, to a cold tub 6 for containing a rapid cooling fluid 5 to be used in the rapid cooling tank 2, and cooling means 7 and 8 for cooling the rapid cooling fluid in the cold tub 6 and the rapid cooling tank 2.

In the rapid cooling hopper 1, the upper open portion is elongated above the water level in the rapid cooling tank 2, and a lower open portion is elongated below the water level in the rapid cooling tank 2. Thus, the fish fed through the upper open portion are transferred by the downward stream of the rapid cooling fluid into the rapid cooling tank 2. The downward stream in the rapid cooling hopper 1 is generated by the rapid cooling fluid supply from the feed pump 9 which is a transfer means for rapid cooling fluid. The suction side of the water pump 9 opens through a filter 10 into the bottom portion of the rapid cooling tank 2 while the discharge side is connected with the upper portion of the rapid cooling hopper 1.

The flow velocity of the downward cooling fluid stream is increased as the difference H1 between the fluid levels of the rapid cooling tanks 2 and the rapid cooling hopper 1 is increased. Since the specific gravity of the rapid cooling fluid 5 is larger than that of the fish, the fish rise to the surface of the rapid cooling fluid 5. Therefore, the flow velocity of the downward stream of the rapid cooling fluid must be selected to be larger than the rising velocity of the fish.

The upper open end of the rapid cooling hopper 1 is connected to the outlet opening of a separator 11, so that the living fish transferred in the seat water by a fish pump 12 are separated from the sea water by the separator 11 and then introduced into the rapid cooling hopper 1.

According to the rapid cooling hopper 1 of such a construction, the fish passing through the rapid cooling hopper 1 can be killed or hardened and cooled.

In the rapid cooling tank 2, the upper portion thereof is inwardly tapered and an outlet opening 13 is provided in the tapered upper end. A porous plate 14 is installed in the same plane with the upper edge of the outlet opening 13, and thereby the fish are guided through the outlet opening 13. Further, an air outlet valve 15 having a float is connected to the upper end portion of the rapid cooling tank 2.

Since the fluid head H1 pressurizes the inside of the rapid cooling tank 2, the air discharge valve 15 is opened when the water level is lowered so as to discharge air gathered at the upper end portion of the rapid cooling tank 2 to the atmosphere, and closed when the water level is raised.

An upwardly tapered guide plate 16 is provided so as to be connected with the upper tapered portion of the rapid cooling tank 2, so that the fish rise in line with the guide plate 16 to the tapered portion of the rapid cooling tank 2.

The elongated portion of the guide plate 16 forms a water passing portion 35 through which fish cannot pass but only rapid cooling fluid can pass. Thus, rapid cooling fluid can freely move behind the guide plate 16 and water pressure is not applied in one direction only on the guide plate 16, so that the guide plate 16 need not be of a pressure-proof construction.

The cooling means 8 for cooling the rapid cooling fluid is provided at the bottom of the rapid cooling tank 2. The rapid cooling fluid 5 is cooled by the cooling means 8 to the freezing point and at the freezing point, a part of the rapid cooling fluid is frozen.

The discharge means 4 comprises a fish conduit 18, one end of which is connected to the upper portion of the rapid cooling tank 2 and the other end connected with the separator 17. Through the fish conduit, the rapid cooling fluid is transferred from the rapid cooling tank 2 to the separator 17 by the difference H2 between the fluid levels, and the killed and cooled fish are transferred to the separator in the rapid cooling fluid.

The separator 17 is adapted to separate the fish and the rapid cooling fluid so that the fish are transferred into the cold storage tank 3 while the rapid cooling fluid is transferred to the cold tub 6.

If the cold storage tank 3 comprises a plurality number of fish tanks, the fish conduit 18 is branched in accordance with each of the fish tanks as shown in FIG. 1. And a discharge valve 19 for switching-over the fish tank to be fed with the fish is provided at each branced portion. The rapid cooling fluid 5 separated by the separator 17 and transferred to the cold tub 6 is recycled to the rapid cooling tank 2 by a return pump 20.

The rapid cooling tank is filled with the rapid cooling fluid which can kill the fish and freeze the body surface of the fish in a short time.

The lower the temperature of the rapid cooling fluid for killing and surface freezing the fish is, the sooner the fish die and freeze.

The temperature at which the fish freezes is −2.5 degrees C. + or − 0.5 degrees C. depending on the kind of the fish.

The partial freezing of the fish body is determined by the size of the fish, the time that the fish are dipped in the rapid cooling fluid, and the temperature of the rapid cooling fluid. When the rapid cooling is at a temperature of −5 degrees C, the freezing time is usually set to be within 20 minutes, and when the rapid cooling fluid is below −10 degrees C., it is set within 10 minutes.

Mackerel pikes about 25 cm long in the rapid cooling fluid at a temperature of −2 degrees C. are still alive for 4 or 5 minutes, though they remain still. However, when they are thrown into the rapid cooling fluid at a temperature of −20 degrees C., they are momentarily hardened and do not break the water at all. Consequently, for killing the fish in the rapid cooling fluid at a temperature of −2 degrees C., it is necessary to dip them into the rapid cooling fluid for a time at least more than 4 or 5 minutes and preferably about 30 minutes, while with the rapid cooling fluid at a temperature of −20 degrees C., it is sufficient to dip them for only more than 1 second to several tens of seconds but within 5 minutes. In this case, when the difference of the temperatures of the fish body and the rapid cooling fluid is large, the heat exchange quantity in a unit time is also large, but the necessary dipping time is very short so the fish can be killed with a small heat exchange quantity. Consequently, the capacity of a freezer for cooling the rapid cooling fluid and the necessary power required can be reduced. If the heat exchange quantity is represented by a letter Q (Kcal), the specific heat of the fish body K (Kcal), and the difference between the temperatures of the fish body and the rapid cooling fluid dT (C), and the quantity of the fish to be cooled G (Kg), the formula $Q = GKdT$ can be obtained. From this formula, when the temperature of the rapid cooling fluid is −20 degrees C, dT is large, but since the dipping time is very short and only a small part of the fish body surface is cooled, the substantial heat exchange quantity q is a very small value, and only a small load on the freezer is required.

The thickness of the frozen part of the fish body surface is optionally selected taking into consideration the size of the fish body, the kind of th fish, the extent of freshness to be required, the cooling time and the like. Usually, the thickness of the frozen part of the fish body surface is selected to be 1/50 to ½, preferably 1/20 to 1/5 thickness of the fish body cross section. The thicker the frozen part of the fish body surface is, the shorter time is required for cooling the fish body after it is taken out of the rapid cooling fluid, but in the thick case, a large quantity of heat must be removed from the fish body.

When the thickness of the frozen part of the fish body surface is as small as below 1 mm, the fish body taken out of the rapid cooling fluid is not wholly hardened but it is so flexible as to be freely deformable by hand. Consequently, in this specification, the term "frozen fish body" is not always limited to the condition in which the whole of the fish body is frozen and hardened, but it involves the condition in which the water and flesh in the fish's surface layer is frozen.

The rapid cooling fluid may consist of an aqueous solution of one or a mixture of fluids harmless to the human body such as propylene glycol, ethylene glycol, calcium chloride, sodium chloride and the like.

In a rapid cooling fluid of an aqueous solution of sodium chloride containing 23.1% of sodium chloride, the eutectic point (freezing point) is −21.2 degrees C. In a rapid cooling fluid of an aqueous solution of calcium chloride containing 29.9% of calcium chloride, the eutectic point is −55 degrees C. The lower the temperature of the rapid cooling fluid, the sooner the fish body can be killed. However, since almost all fish bodies can be instantly killed and hardened in the rapid cooling fluid at a temperature about −20 degrees C., a still lower temperature is not required. On the contrary, if the rapid cooling fluid is at a super-low temperature, the load on the freezer becomes large and the heat intruding into the rapid cooling fluid increases, uneconomically. Therefore, the rapid cooling fluid according to the present invention is most effective when it is at a temperature about −5 degrees C. to about −30 degrees C., and the fish can be killed by using a freezer of small power.

In the cold tub 6, the cooling means 7 is provided for cooling the rapid cooling fluid 5.

In the fish tank which is the cold storage tank 3 for realizing the process of maintaining the fish cold, a cooling fluid of a higher temparature than that of the rapid cooling fluid is used, which comprises, for example, sea water mixed with fresh water ice, sea water mixed with sea water ice or fresh water mixed with fresh water ice. The temperature of this cooling fluid is selected to be higher than the freezing point of the fish body, usually at about −3 degrees C. to 3 degrees C.

The operation of the apparatus for killing and cooling the fish shown in FIG. 1 consists of the following steps.

(1) The discharge valve 19 is closed, the water pump 9 is operated and the fish are thrown into the rapid cooling hopper 1. Due to the difference H1 between the water levels of the rapid cooling hopper 1 and the rapid cooling tank 2, the living fish are lowered down the rapid cooling hopper 1. The fish thrown into the rapid cooling tank 2 rise in the rapid cooling tank 2, and rise through the tapered portion in line with the guide plate 16, and then are blocked by the porous plate 14 to be completely immersed in the rapid cooling fluid.

(2) After a predetermined time, when the fish are instantly killed and frozen on their surface layer, by opening the discharge valve 19 the fish are transferred with the rapid cooling fluid to the separator 17, and separated from the rapid cooling fluid by the separator 17 to be stored in the fish tank which is the cold storage tank 3. The fish in the fish tank are cooled uniformly to the center of the fish body. The rapid cooling fluid 5 is transferred from the separator 17 to the cold tub 6.

(3) By operating the return pump 20, the rapid cooling fluid is recycled to the rapid cooling tank 2 so as to keep unchanged the water level in the rapid cooling tank 2. The speed of dischargeing fish is controlled by the degree of opening the return valve 21.

(4) The return pump 20 and the feed pump 9 can be substituted by a circulation pump 22 the connection of which is shown in the dotted line in FIG. 1.

By operating the circulation pump 22, the rapid cooling fluid in the cold tub 6 is transferred to the rapid cooling hopper 1, and then circulated from the rapid cooling hopper 1 through the rapid cooling tank 2 and separator to the cold tub 6 so that live fish are transferred to the rapid cooling tank 2 while frozen fish are transferred from the rapid cooling tank 2 to the separator 17.

(5) While the fish are fed into the rapid cooling tank 2, the fish are discharged out of the upper portion of the rapid cooling tank 2 in such a regular order that earlier fed fish are discharged earlier. Therefore, continuous operation of instantly killing and rapid cooling fish can be achieved. Further, as mentioned above the batchwise discharge operation can be selected if desired, in which after a predetermined time from the feeding of fish, the fish are discharged by opening the discharge valve 19 and the return pump 20 is operated.

In the apparatus for instantly killing and cooling fish, the cold storage tank 3 is a comparatively small container such as a fish container. The container is preliminarily filled with crushed ice of fresh water the melting point of which is 0 degree C. The fish separated from the rapid cooling fluid by the separator 17 are put into the container and cooled.

Figure 2:
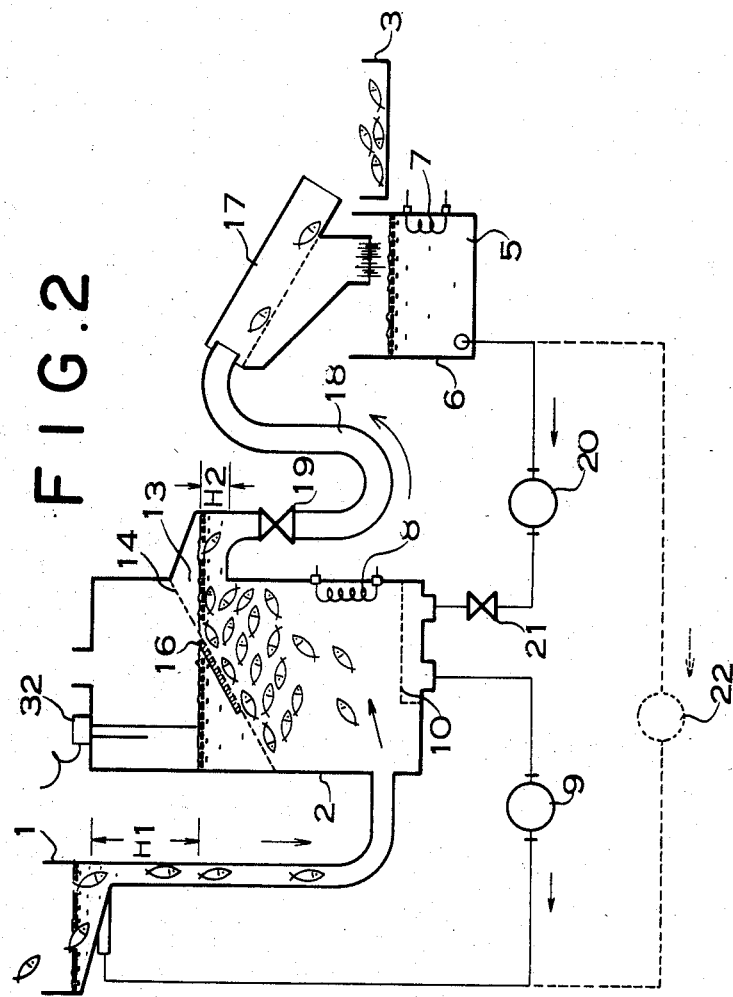

The operation of the return pump 20 is initiated or stopped by a level detector 32 (FIG. 2) provided on the upper portion of the rapid cooling tank 2, so that the fluid level in the rapid cooling tank 2 can be kept at a predetermined position.

The fish instantly killed an rapidly cooled in the rapid cooling tank 2 are frozen only on their surface layer. In this case, the inner portion of the fish body can be uniformly cooled by the frozen body surface. In other words, since the fusion heat of the frozen portion is about 80 cal per gram, 10 g of frozen portion can take 800 cal of heat from the environment. 800 cal of heat is required for cooling 40 g of fish body from 20 degrees C. to 0 degree C. When the frozen portion of the fish body melts to cool its environment, it takes a large amount of heat from the environment. But preferably, since the frozen fish's body surface are kept at the temperature of its freezing point, that is, −2.5 degrees C. + or − 0.5 degrees C., and the temperature of the fish's body surface does not rise, the fish body can be uniformly cooled to the innermost portion in a short time.

In cooling the inner portion of the fish body by its frozen surface portion, 10% by volume of the fish body must be frozen in order to cool the innermost portion of the fish body from 20 degrees C. to 0 degree C. But fortunately, 10% by volume of the fish body is equivalent to a remarkably thin surface layer of the fish body. For example, in a fish body which is 40 mm in the diameter of the cross section, its 2 mm thick surface layer correspondes to 10% of its whole volume. Therefore, in the fish body of such a size, only by freezing its 2 mm thick surface layer, its innermost portion can be cooled from 20 degrees C. to 0 degree C. due to the fusion heat of the frozen portion if the heat intruding from outside is disregarded.

When an extremely thin surface layer of a fish's body is frozen in a short time, its flesh quality is not degraded and good fish taste can be obtained.

Figure 3:
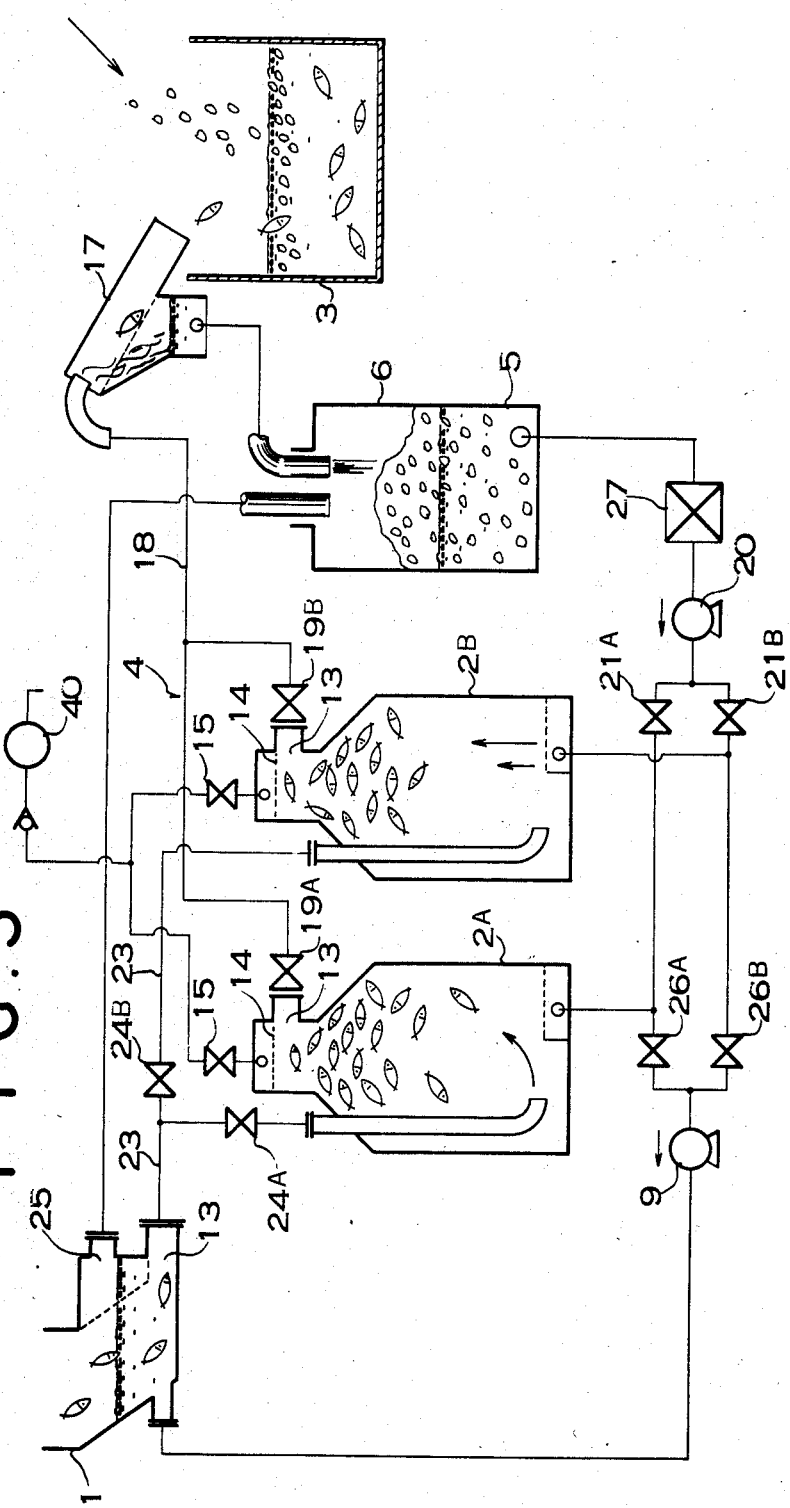

FIG. 3 shows an apparatus for hardening and cooling of living fish provided with two rapid cooling tanks 2A and 2B. In this apparatus, the fish are introduced into the rapid cooling tank 2A and the fish are discharged out of the other rapid cooling tank 2B, and thus batchwise feeding and batchwise discharge operations are achieved. According to this apparatus, the living fish can be killed and cooled during a predetermined time in the rapid cooling tanks 2A, 2B and furthermore the fish can be almost continuously fed and discharged.

In FIG. 3, the outlet openings 13, 14 are connected through the outlet valves 19A, 19B to the fish conduit 18 which is a discharge means 4, and the end of the fish conduit 18 is connected to the separator 17.

A feeding pipe 23 connecting the rapid cooling hopper 1 and the rapid cooling tanks 2A, 2b is branched and connected through the feed valves 24A, 24B to the rapid cooling tanks 2A, 2B.

An overflow opening 25 is provided above the fluid level in the rapid cooling hopper 1. When a large amount of living fish are introduced at one time into the rapid cooling hopper 1, the rapid cooling fluid overflows through the overflow opening 25 into the cold tub 6. Therefore, the feeding of the fish into the rapid cooling tanks 2A, 2B is automatically controlled. In other words, the rapid cooling fluid of a volume equal to that of the fish introduced into the rapid cooling tanks is returned into the cold tub 6.

The suction side of the water pump 9 is branched, and the two branches are connectd through suction valves 26A, 26B to the rapid cooling tanks 2A, 2B respectively. The discharge side of the return pump 20 is branched, and the two branches are connected through the return valves 21A, 21B to the rapid cooling tanks 2A, 2B respectively, and the suction side is connected through a filter 27 to the cold tub 6 for holding the rapid cooling fluid. The filter 27 is provided for removing polluting substances.

The cold tub 6 is filled with ice which is a cooling means for cooling the rapid cooling fluid to a predetermined temperature, and the rapid cooling fluid is cooled during passage through the ice.

The ice in the cold tub 6 has a melting point equal to the abovementioned predetermined temperature of the rapid cooling fluid. So, the ice is obtained by freezing the rapid cooling fluid. When the ice melts, the rapid cooling fluid is cooled to the predetermined temperature.

The apparatus as shown in FIG. 3 is operated as follows.

Firstly, in preparation for operation, by operating the return pump 20 with the return valve 21A, 21B open, the rapid cooling fluid is fed into the rapid cooling tanks 2A, 2B until they are full. Then, air in the rapid cooling tanks 2A, 2B is discharged out through the air discharge valve 15.

(1) Introduction of the fish into the rapid cooling tank 2A

The water pump 9 is operated with the suction valve 26A being open, the suction valve 26B closed, the feed valve 24 open, the feed valve 24B closed, the return valves 21A, 21B closed and the discharge valves 19A, 19B closed, The fish, being cooled, are introduced through the rapid cooling hopper 1, the feed valve 24A and the feed pipe 23 into the rapid cooling tank 2A. The capacity of the feed pump 9 and the cross section area of the feed pipe 23 are so decided that the flow rate of the rapid cooling fluid passing through the feed pipe 23 is larger than the rising rate of the fish.

Further, the rapid cooling tanks 2A, 2B are of a selected and pressure-proof construction. The rapid cooling hopper 1 may be positioned at the same level with the rapid cooling tanks 2A, 2B or below them. Due to the volume of the fish fed into the rapid cooling tank 2A, the fluid level in the rapid cooling hopper 1 rises. Then, the same volume of the rapid cooling fluid is returned through the overflow opening 25 into the cold tub 6.

(2) Discharge of the fish from the rapid cooling tank 2A

The return pump 20 is operated with the return valve 21A being open, the return valve 21B closed, the suction valves 26A, 26B closed, the feed valves 24A, 24B closed, the discharge valves 24A, 24B closed, the discharge valve 19A open and the discharge valve 19B closed, so that rapid cooling fluid in the cold tub 6 is introduced into the rapid cooling tank 2A. The fish in the rapid cooling tank 2A are successively discharged in such a regular order that the fish introduced earlier, having risen up and partially frozen, are discharged first. The fish are transferred through the fish conduit 18 to the separator 17 and introduced into the cold storage tank 3. The fish frozen in their body surface are transferred from the rapid cooling tank 2A into the ice water in the cold storage tank 3. Since the fish are frozen only in their body surface, the specific gravity of the fish is larger than that of the ice water mixed with sea water and crushed ice, and the fish sink to the bottom of the fish tank.

(3) The cold tub 6 is filled with the rapid cooling fluid 5 having such a salt concentration as to make the freezing point of the rapid cooling fluid about −10 degrees C. to −30 degrees C., and crushed ice. Since the crushed ice is dipped into the rapid cooling fluid, the rapid cooling fluid is cooled substantially to the same temperature that of the crushed ice. The fish are cooled by this cold rapid cooling fluid and die of shock. The crushed ice absorbs about 80 cal/cc of fusion heat when it melts. Therefore the rapid cooling fluid can strongly cool the fish in a short time through the heat exchange with the body heat of the fish.

(4) The air discharge valves 15 on the upper portion of the rapid cooling tanks 2A, 2B comprise a float valve which discharges only air out to keep the level of the rapid cooling fluid at the predetermined position immerse all fish bodies in the rapid cooling fluid.

If the rapid cooling hopper 1 is positioned below the rapid cooling tanks 2A, 2B, the suction side of a vacuum pump 40 is connected to the discharge valve 15 as shown in FIG. 3 so as to compulsorily discharge air out of the rapid cooling tanks 2A, 2B to reduce the inside pressure, whereby the rapid cooling fluid in the rapid cooling hopper is sucked into the rapid cooling tanks 2A, 2B.

(5) The rapid cooling tanks 2A, 2B can be substantially continuously operated for rapid cooling the fish, by operating each of the valves and the pumps so that the fish are discharged out of one of the rapid cooling tanks 2A, 2B while the fish are introduced into the other.

Further, by positioning the rapid cooling hopper 1 below the rapid cooling tanks 2A, 2B and positioning the separator 17 above the rapid cooling tanks 2A, 2B, this apparatus functions also as a fish pump which can suck up the fish with the rapid cooling fluid from a low position and transfer them under pressure to a high position without causing any damage to them. In this case, the rapid cooling fluid is recycled through the overflow opening 25 to the cold tub 6 by a pump.

Figure 4:
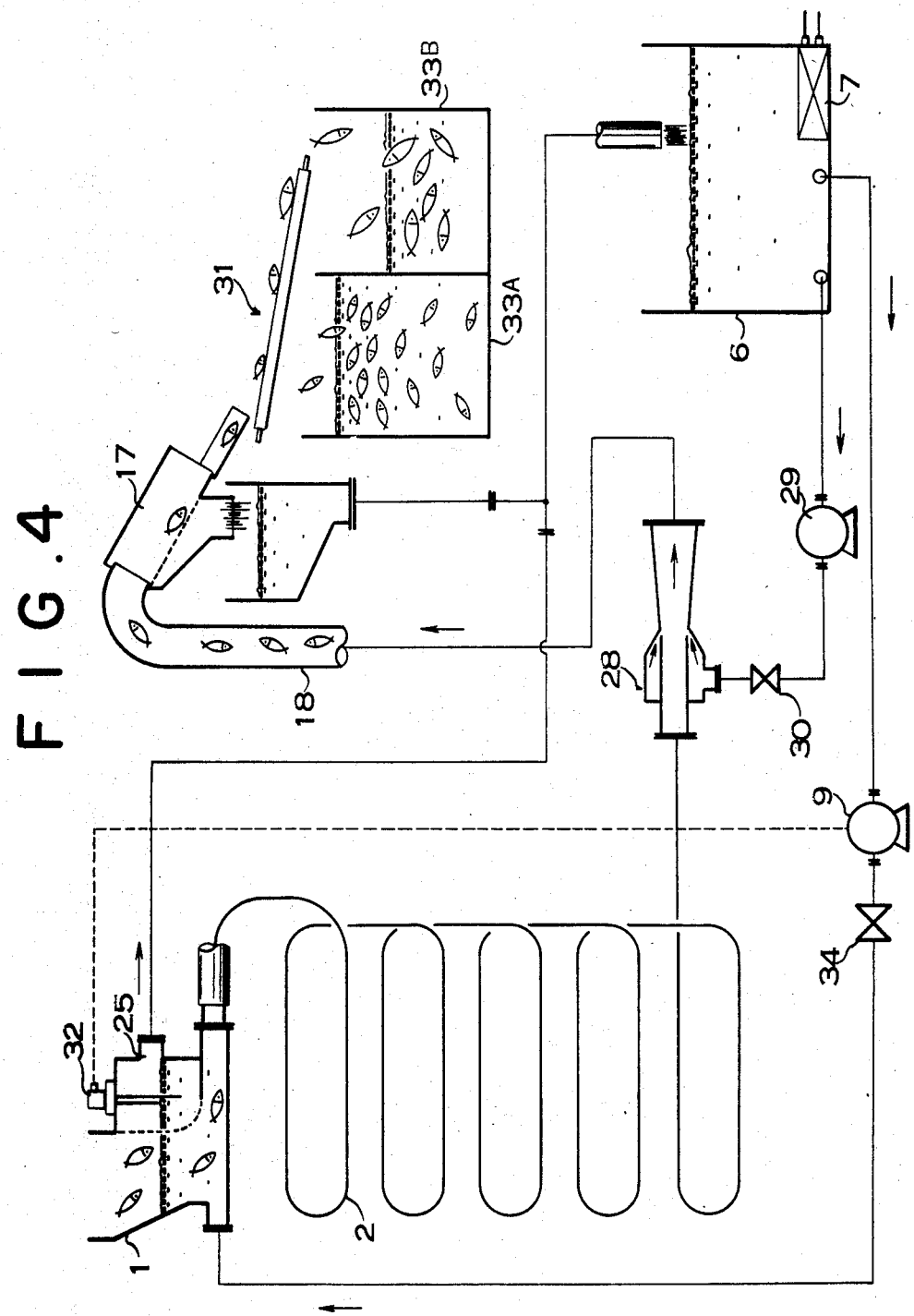

In FIG. 4, another apparatus is shown for instantly killing and cooling fish.

In this apparatus, the rapid cooling tank 2 comprises a pipe which is formed in a coil-like shape. The upper end of this pipe-shaped rapid cooling tank 2 is connected to the rapid cooling hopper 1 while the lower end is connected through a fish pump 28 to the separator 17.

The fish pump 28 comprises an ejector pump. The ejector pump obliquely ejects the rapid cooling fluid discharged out of the booster pump 29 toward the inside of a tube and in the transfer direction so as to forcibly transfer the fish.

The transfer capacity of the ejector pump is controlled by a control valve 30 provided on the discharge side of the booster pump 29.

A grader 31 for grading the size of fish is provided between the discharge side of the separator 17 and the fish tank which is the second cold storage tank.

The grader 31 is adapted to drop the fish through a plurality of long slits. Since the slits are formed in a tapered shape, the small-sized fish are thrown into a fish tank 33A and the large-sized fish are into the fish tank 33B.

The suction side of the feed pump 9 for feeding the rapid cooling hopper 1 with the rapid cooling fluid is connected to the cold tub 6. The operation of the feed pump 9 is controlled by the level detector 32 of the rapid cooling hopper 1. When a large amount of fish is introduced at a time or when the water feed capacity of the feed pump 9 is larger than the discharge capacity of the fish pump 28, the fluid level in the rapid cooling hopper rises. When the fluid level rises and the rapid cooling fluid is overflowed, the operation of the feed pump 9 is stopped, and when the fluid level is lowered, the feed pump 9 is operated.

Figure 5:
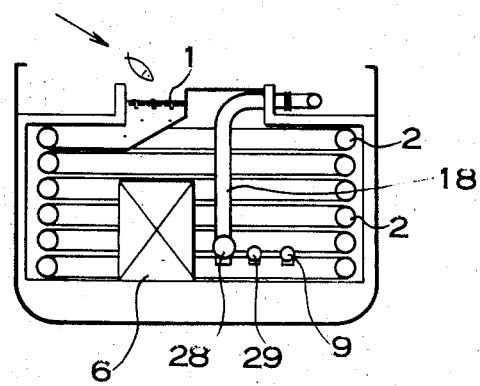
FIG. 5 is a cross sectional drawing showing the installation of the system in FIG. 2 inside a fishing vessel.

According to the apparatus for instantly killing and cooling fish shown in FIG. 4, the rapid cooling tank 2 can be positioned inside the other wall of a fish tank, by making use of the defined fish tank in a transport ship as shown in FIG. 5.

In this case, in the space at the center of the coiled rapid cooling tank 2, the cold tub 6, the fish pump 28, the booster pump 29, the water pump 9 and the like can be positioned.

According to this structure, the adiabatic effect can be improved in comparison with the case in which the fish tank is used directly as the rapid cooling tank. This is because, according to this structure, the rapid cooling tank 2 and the cold tub 6 can be further adiabatically treated by the air in the fish tank.

If the rapid cooling tank 2 comprises a coiled tube as shown in FIGS. 4 and 5, the following advantages can be realized.

Since the rapid cooling tank 2 has a tubular shape, the living fish transferred through the rapid cooling tank 2 are certainly and uniformly dipped in the rapid cooling fluid for a predtermined time. In other words, the tubular rapid cooling tank 2 is elongated downwardly from the rapid cooling hopper 1, the stream of the rapid cooling fluid is against the rising of the fish, and even if the tubular rapid cooling fluid is short, the fish can come in contact with a large amount of the rapid cooling fluid and a high exchange efficiency can be obtained.

Further, since the body surface of the fish have been hardened by cooling and freezing, the fish passing through the fish pump 28 are hardly damaged. Besides, since the feed pump 28 comprises an ejector pump, the fish are more free from damage, in comparison with the case of a rotary fish pump where the fish body is to be bent. Usually, since the ejector pump is energized by the high pressure booster pump, high pressure water strikes the gill portion of a fish body. So, the gill portion of a fish body passing with its head portion ahead swells out and is apt to be damaged. But according to the present invention, the surface of the fish body is frozen and free from such damage.

Furthermore, since the ejector pump is located at the bottom of the rapid cooling tank 2 and the discharge side of the fish conduit 18 is upwardly elongated, the fish are apt to surface and can smoothly rise to be introduced to the separator 17, even though the discharge side has a large aperture due to a diffuser structurally required for the ejector and the flow rate there is lowered.

The fish discharged out of the separator 17 are introduced to the grader 31. In this step, the fish are already dead and do not leap at the grader 31, and they can be efficiently graded. Generally according to the conventional art, when mackerel pikes lifted by a fish pump are graded by a grader, they leap and do not drop through narrows slits, and large fish are apt to be mixed with small fish.

The time of cooling the fish in the rapid cooling tank 2 can be controlled by the flow rate of the rapid cooling fluid passing through the pipe. By opening the control valve 30 on the discharge side of the booster pump 29, the flow rate of the stream in the pipe which is the rapid cooling tank 2 can be increased. In this case, since the level of the rapid cooling fluid in the rapid cooling hopper 1 is lowered, an increased amount of rapid cooling fluid is introduced into the rapid cooling hopper 1 by increasing the open degree of the feed valve 34 on the discharge side of the feed pump 9.

If the size of the fish is large or the temperature of the rapid cooling fluid is high, a longer cooling time is required. In this case, by narrowing down the control valve 30 of the booster pump 29, the discharge pressure of the ejector is lowered. Then an inceased amount of rapid cooling fluid is introduced into the rapid cooling hopper 1, but the rapid cooling fluid in the rapid cooling hopper 1 is returned through the overflow opening 25 into the cold tub 6. Further, in such a case, by detecting the rapid cooling fluid in the rapid cooling hopper 1 by a level detector 32, the operation of the water pump may be started or stopped.

By using a synthetic resin or metal pipe or a flexible hose as the rapid cooling tank 2, a dead space in the ship's hold can be effectively made use of and such a rapid cooling tank 2 can be easily equipped.

Figure 6:
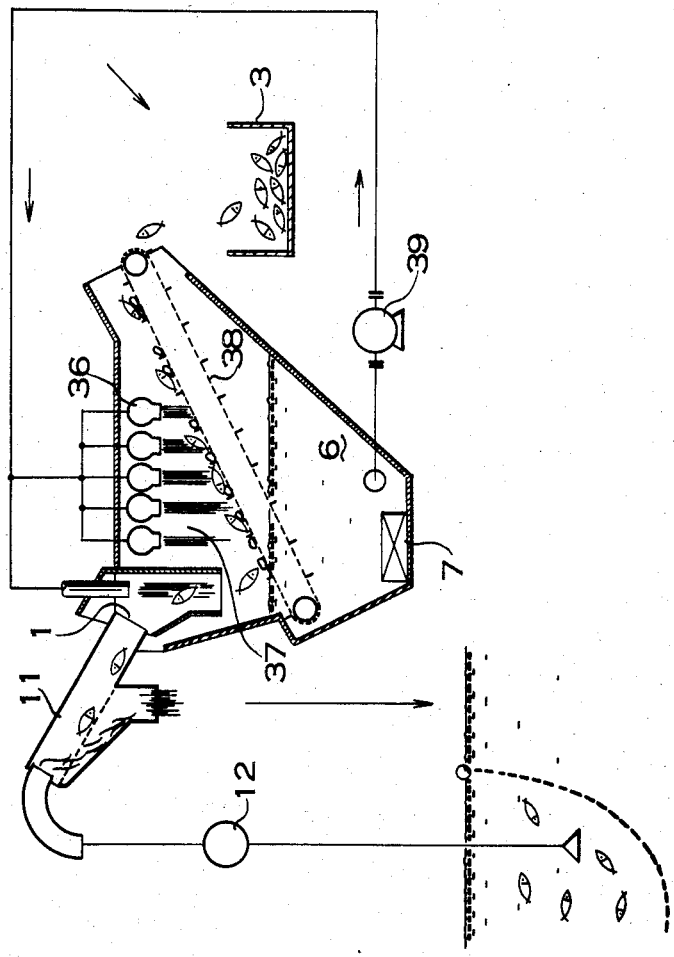

The fish execution and cooling system shown in FIG. 6 kills and preserves live fish by creating conditions physically identical to immersing the fish in rapid cooling fluid. In this fresh cooling process, live fish are sprayed with rapid cooling fluid through nozzles 36.

In this system, live fish are introduced into the rapid cooling tank or rapid cooling chamber 37 through the rapid cooling hopper 1. A net conveyor belt 38 is installed in the rapid cooling chamber 37 to receive the fish.

A number of nozzles 36 installed above the net conveyor belt 38 spray the live fish with rapid cooling fluid. A cycle is formed by which a feed pump 39 delivers rapid cooling fluid to the nozzles 36 from a cold tub 6 where the fluid collects.

The rapid cooling tank or rapid cooling chamber 37 is constructed such that its lower chamber serves as the cold tub 6.

The organization of this fish execution and cooling system is such that the live fish come in contact with the rapid cooling fluid for only a short time. It follows that the temperature of the cooling fluid should be set below minus 10 degrees C. (14 degrees F.), and temperatures in the minus 30 degrees C. (minus 22 degrees F.) range are desirable.

Fish that come out of the rapid cooling tank are in an instant cooling stage. It is undesirable to transfer heat to the surface of the fish by suddenly immersing them in ice water at a temperature higher than that of the frozen fish's outer surface layer.

Figure 7:
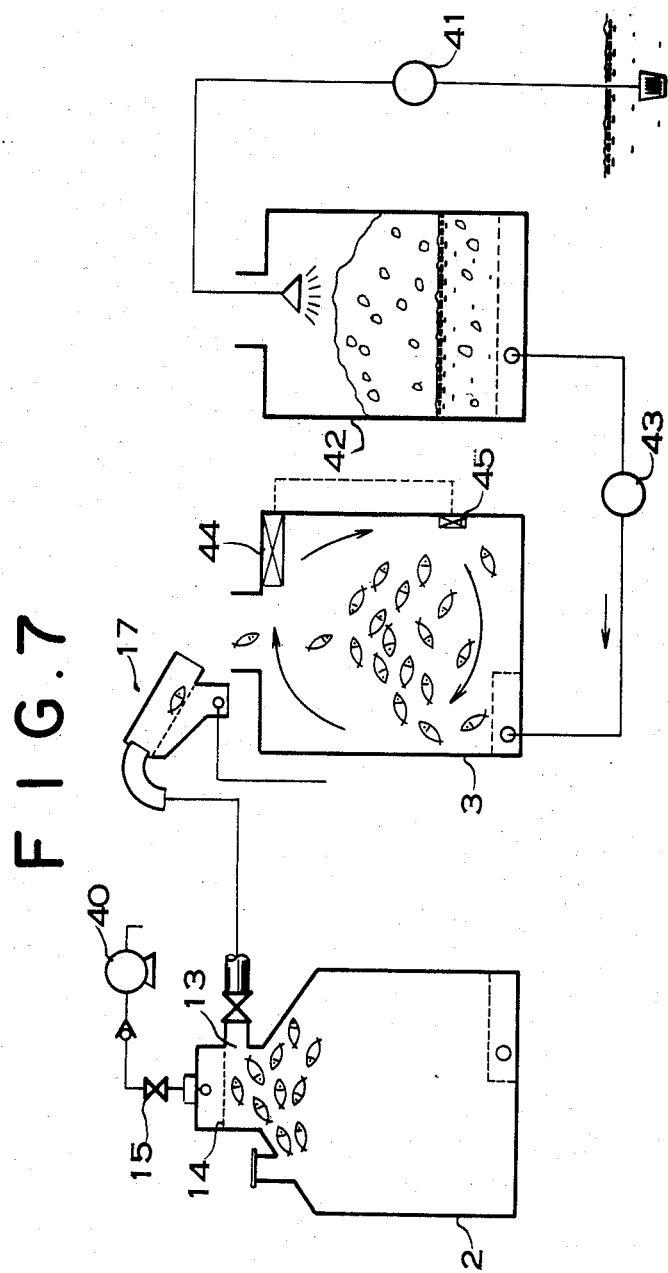

The fish execution and cooling system shown in FIG. 7 is organized such that fish are transferred to a cold storage tank 3 after being put through a rapid cooling tank 2. The cold storage tank 3 keeps the fish at a low temperature for a fixed time period by circulating cold air. After the fish are thoroughly cooled, and an approximately uniform temperature is attained throughout the body of each individual fish, chilled sea water is fed into the cold storage tank 3. For this process, a somewhat thick, for example more than 1 mm, surface layer is frozen on each fish in the rapid cooling tank 2. Each fish body is thus solidified so distortion or damage caused by piling fish on top of each other in the waterless, air cooled, cold storage tank 3 can be prevented. After the fixed time period during which individual fish bodies soften, sea water cooled by crushed ice, etc. is introduced, immersing the fish in cold water.

As shown in FIG. 7 sea water is introduced into an extra cooling tank 42 by means of a water pump 41. Sea water is cooled in the tank 42 by crushed ice previously loaded in that tank. The cooled sea water is then fed to the cold storage tank 3 by means of a cooling water pump 43.

This process eliminates the job of loading the cold storage tank 3 with crushed ice. This job, which is representative of the hard labor involved in netting and other mass fish capture operations in the fishing industry, has been a stumbling block to manpower reduction.

In the rapid cooling tank 2 the surface layer of each fish is frozen, killing the fish and stiffening its muscles. Because the fish transferred to the cold storage tank 3 are in a hardened state, air gaps will be created in that tank. The fish are effectively cooled by circulating cold air through these gaps as indicated by the arrows in FIG. 7 using a cooler 44.

In the cold storage tank 3 the cooler 44 is controlled by a temperature sensor 45 installed in that tank. The temperature is set above the freezing temperature of the fish, which is generally minus 2.5 degrees C. + or − 0.5 degrees C. (27.5 degrees F +or− 0.9 degrees). A more desirable temperature is the lowest value at which the fish meat will not freeze, or the "partial freezing point".

The fish are left in the are cooled cold storage tank 3 for a set time until each fish reaches a uniform temperature inside as well as at its surface. At this point, the frozen fish will soften, so cooling water is quickly introduced to keep fish on the bottom of the cold storage tank 3 from being crushed by those above, and thus equalize the pressure exerted on each fish.

In cases where either the cold storage tank 3 is shallow, the fish are of such a variety that their bodies are relatively firm, or the temperature of the cold storage tank 3 is set below the freezing point of the fish, the fish can be stored in the air cooled condition for long periods. Since no crushed ice or cooling water is added to the fish in the cold storage tank 3 for these cases, more fish can be accommodated in a given sized tank.

Further, agitation of the fish caused by the ship pitching and rolling during navigation in rough seas is minimized. Under these circumstances, less damage is done to the fish than when immersed in ice water etc., and operational safety is also achieved. When the fish are transferred ashore, cooling water can be introduced to the cold storage tank 3 so any fish that are frozen together will come loose. The immersed fish can best be transferred ashore by a hoisting net or fish pump.

Figure 8:
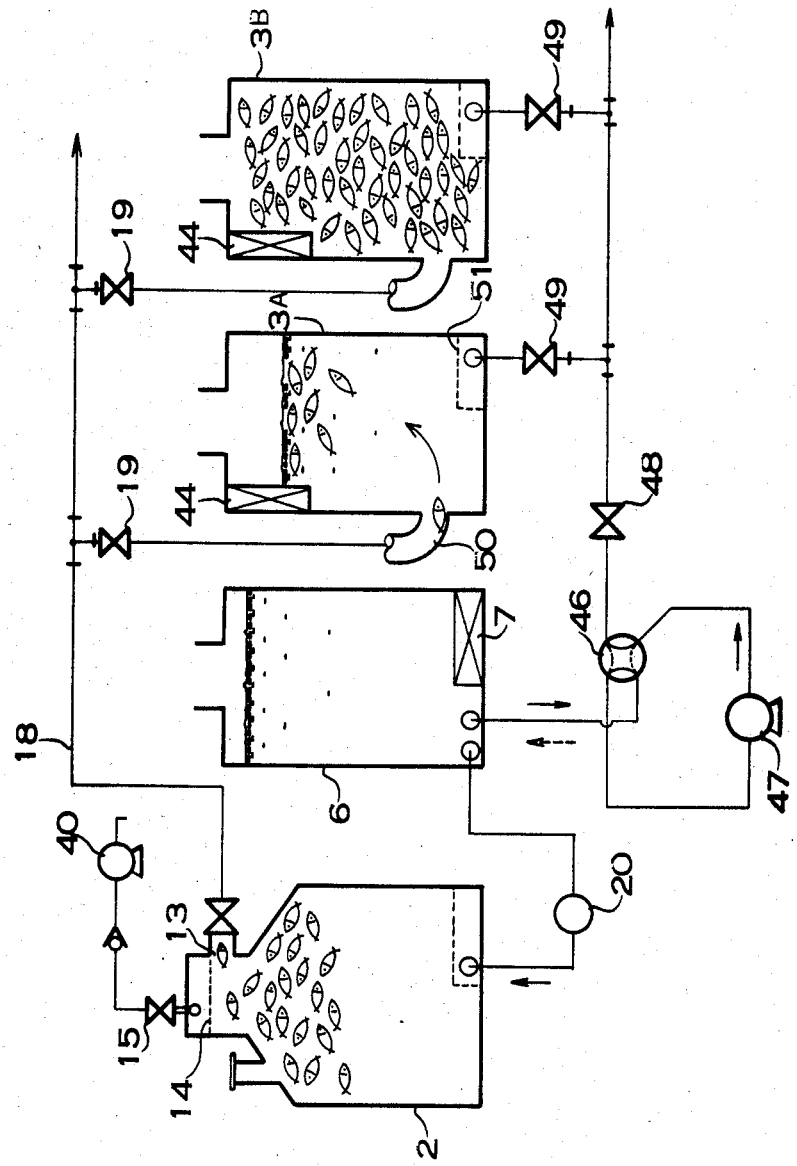

In the fish execution and cooling system shown in FIG. 8 fish are killed by the shock of sudden freezing in a rapid cooling tank 2, transferred to a cold storage tank 3 after being surface frozen, and stored under air cooling in that cold storage tank 3. In this system, the cold storage tank 3 temperature is set below the freezing point of the fish to maintain them in a surface frozen state. To transfer the fish ashore at port, rapid cooling fluid is added to the cold storage tank 3 to separate any fish that may have frozen together, then a fish pump moves frozen fish to tanks loaded on trucks etc.

As shown in FIG. 8, the cold tub 6 is connected to a filter 51 in the base of the cold storage tank 3A through a four way valve 46, a combination feed and discharge pump 47, a main feed/discharge valve 48, and a feed/discharge valve 49. Through an opening in the side near the base of the cold storage tank 3A connection is also made to a fish conduit 18 through an outlet valve 19. A cooler 44 is installed inside the cold storage tank 3A to keep the temperature below the freezing point of the fish in that tank.

The system shown in FIG. 8 is operated by the following procedure. The return pump 20 is turned on to pressure feed rapid cooling fluid from the cold tub 6 to the rapid cooling tank 2. Fish together with rapid cooling fluid are fed to the opening 50 in the side of the cold storage tank 3A through the outlet valve 19 from the fish conduit 18. At the other end of the system, the four way valve 46 is set open through the dotted lines shown in FIG. 8, the main feed/discharge valve 48 and the feed/discharge valve 49 are set open, the feed/discharge pump 47 is turned on, then rapid cooling fluid is filtered out of the cold storage tank 3A through the filter 51 and returned to the cold tub 6.

After the specified amount of fish have been put in a cold storage tank 3A, either the return pump 20 is turned off, or fish transfer is switched to another tank by closing one outlet valve 19 and opening another 19. Even after fish transfer to the cold storage tank 3A has ceased, the feed/discharge pump 47 is left running until all the rapid cooling fluid is discharged from that tank. At this point one feed/discharge valve 49 is closed, and the rapid cooling fluid from another cold storage tank is discharged through that feed/discharge valve 49. The cold storage tank 3B is conveniently shown filled with fish and all the rapid cooling fluid removed.

Fish are cooled by the cooler 44 which is capable of maintaining temperatures below the freezing temperature of the fish.

The fish are maintained cold with frozen surface layers over a period of time. At port they are transferred ashore in this frozen condition.

Figure 9:
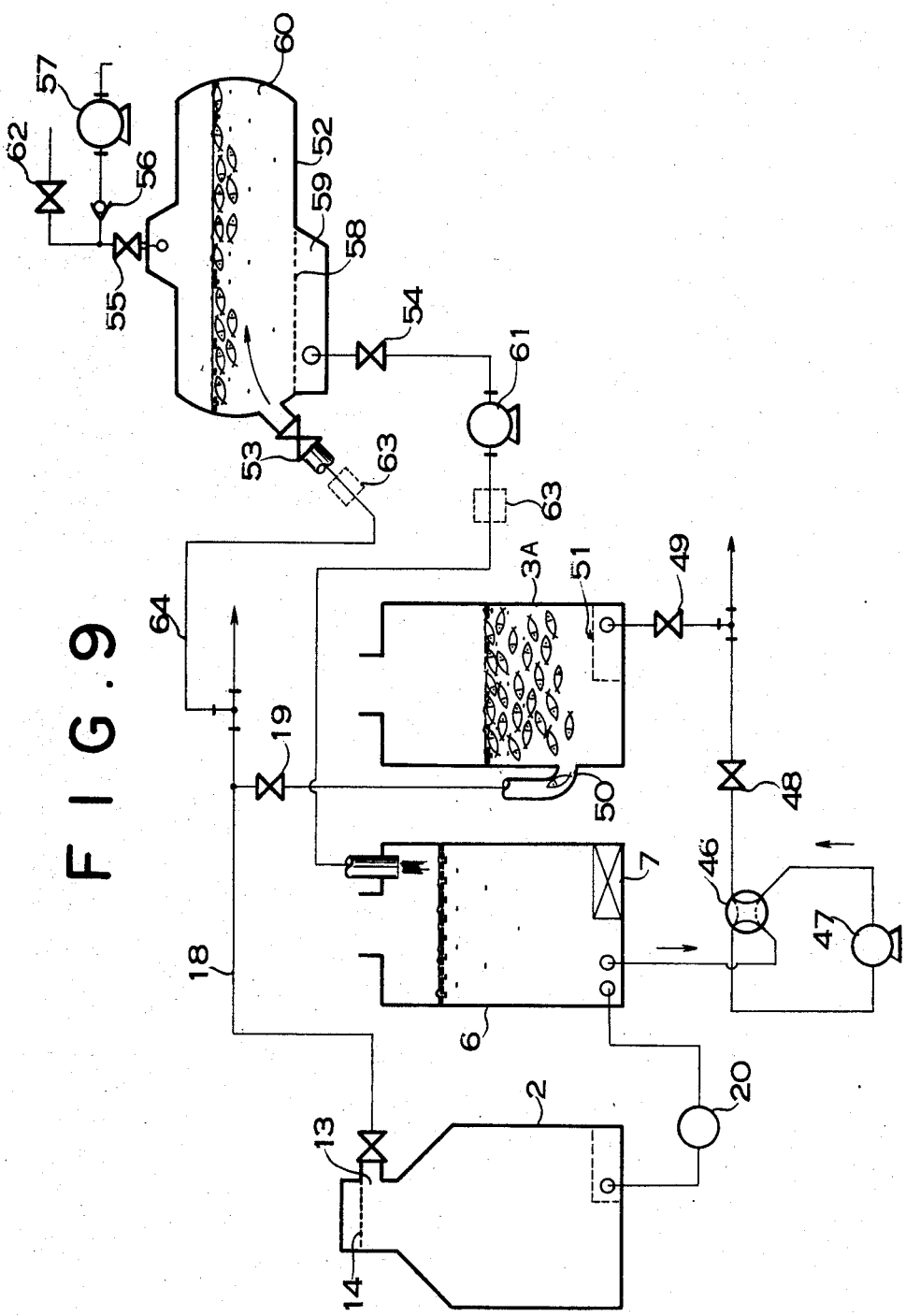

FIG. 9 is an operational example of the transfer of fish into a tightly constructed fish tank 52 on board a truck etc. The four way valve 46 is set as indicated by the solid lines of FIG. 9, the main feed/discharge valve 48 and the feed/discharge valve 49 are opened, the outlet valve 19 is opened, and the feed/discharge valve 53 and the outlet valve 54 of the fish tank 52 are opened. The feed/discharge pump 47 is turned on, and rapid cooling fluid is fed to the cold storage tank 3A. When sufficient fluid has been supplied to the cold storage tank 3A to float the fish in that tank, they can be sucked into the truck fish tank 52.

The fish tank 52 is a pressurized structure that is connected to the suction side of a vacuum pump 57 through a float valve 55 and a reverse flow check valve 56. A water chamber 59 is built into the bottom of the fish tank 52 and is separated from the rest of the tank by a filter that will not pass any fish. The upper portion of the tank or fish chamber 60 is connected to the cold storage tank 3A through a feed/discharge valve 53, a flexible suction hose 64, the fish conduit 18, the outlet valve 19, and the opening 50.

The procedure for transferring fish to the truck fish tank 52 is as follows. The vacuum pump 57 is turned on and the pressure inside the fish tank 52 is reduced. Fish together with rapid cooling fluid are sucked into the fish tank 52 from the cold storage tank 3A to fill the fish chamber 60. When the rapid cooling fluid in the fish chamber 60 reaches a certain level, a water discharge pump 61 is turned on to suck rapid cooling fluid from the water chamber 59 thereby further reducing the pressure in the fish tank 52, and increasing the rate of fish and fluid transfer. When the fish and fluid level reach the upper limit of the tank 52 the float valve 55 will close and the vacuum pump 57 will shut off. Continued operation of the water discharge pump 61 will densely concentrate to the fish in the chamber 60. At this point an air inlet valve 62 in parallel with the vacuum pump 57 is opened letting air in at the same time as the feed/discharge valve 53 is closed and fish transfer is ceased. The water discharge pump is left running until all the rapid cooling fluid has been removed from the fish chamber 60.

Since the amount of rapid cooling fluid supplied to the cold storage tank by the feed/discharge pump 47 effects the speed of fish transfer to the fish tank 52, that pump 47 should be switched on and off by monitoring the suction of fish into the tank 52. If either the flexible suction hose 64 or a section of the fish conduit 18 is transparent, the concentration of fish and fluid sucked into the fish tank 52 can be observed externally.

The fish in the cold storage tank 3A float on the fluid in that tank. As the amount of fish in the cold storage tank 3A is reduced, it is necessary to decrease the fluid level in that cold storage tank 3A. By temporarily switching the feed/discharge pump 47 off, the fluid level is decreased, the bottom of the floating mass of fish comes down to the opening 50, and fish are sucked from the cold storage tank 3A.

When the transfer of fish to the truck fish tank 52 is complete, the flexible suction hose 64 and the water discharge pump 61 hosing is disconnected at the connectors 63 indicated by dotted lines in the diagram. The fish are then transported to the destination preparation or processing plant.

When subsequent air cooling of fish frozen only through a thin surface layer is compared to subsequent cooling in rapid cooling fluid, a relatively long time is required for complete cooling cold air because of less heat conduction through the frozen layer. On the other hand, because a low temperature can be maintained for a long period in the air cooled case, large quantities of fish can be kept frozen for long periods with a minimum of cooling equipment. When fish are transferred out of the cold storage tank 3, the rapid cooling fluid used to surface freeze and kill the fish can again be used to efficiently move them ashore through plumbing. When numerous fish tanks are involved, the rapid cooling fluid can be used over and over to transfer fish from consecutive tanks, thus accomplishing the job with only a small quantity of fluid.

This invention provides a system to kill fish by cooling their outer surface layer with a rapid cooling fluid, and then preserve them by cooling the insides of the fish from this layer. Fish killed and preserved by this method maintain a flavorful fresh taste for long periods. Clearly, fish treated in this manner can be further stored for long periods, for example from a month to several years, by complete freezing as soon as possible after initial treatment.

It is also possible to uniformly cool the entire body of the fish by allowing the frozen surface layer to gradually cool the insides of the fish. As previously mentioned, when fish are cool uniformly throughout by the heat of fusion absorbed by the frozen outer layer, further cooling is not always necessary after the initial partial freezing. For example, the fish can be put in a storage tank with no cooling provisions, or they can be thermally insulated.

In the first rapid cooling step, the fish are thrown into a liquid at a temperature below 0 degree C. or preferably into a rapid cooling fluid at a temperature below $-7$ degrees C. or $-8$ degrees C. and rapidly cooled on the body surface so that in the primary or instant cooling stage the fish die from shock and then they are discharged after a few minutes to a few tens of minutes. Then in the secondary or cold storage stage, the fish are dipped and kept cool in an atmosphere at a higher temperature than that of the rapid cooling fluid or preferably in ice water at a temperature of about 0 degree C. obtained by mixing crushed ice and sea water and more preferably in salt ice water (the salt concentration of which is higher than that of sea water and the melting point of which is $-2.5$ degrees C. $+$ or $-$ 0.5 degrees C.

As result, the fish are preserved with a degree of freshness which is higher than that of fish instantly killed by stabbing their hindbrains.

In other words, according to the present invention, since fish are made to die from shock in the rapid cooling fluid in the primary or instant cooling stage, little ATP included in the fish body is consumed, and the lactic acid produced by the decomposition of glycogen can be reduced. Consequently, self-digestion or the freshness degradation in the early stage can be remarkably controlled. Generally, the words "the fish of the highest degree of freshness" refers to the state of the fish prior to cadaveric rigidity where the flesh quality of the fish has not changed yet. But in the fish rapidly cooled and instantly killed according to the present invention, the cadaveric rigidity starts late and the duration of cadaveric rigidity is long. Therefore, the fish can be kept fresh for a long time.

At the same time, fish instantly killed according to the present invention can be cooled more rapidly the fish instantly killed according to the conventional method of stabbing the hindbrain, and the following cooling and cold maintenance steps can be efficiently applied to the fish.

Fish which have been stabbed in the hindbrain are observed in detail to be mincingly trembling and still alive for seconds to several tens of seconds after being stabbed with a sharp tool. On the contrary, according to the present invention, hen the fish are dipped into cooling fluid at the temperature of $-20$ degree C., their eyeballs change white in about a second and at the same time the fish's body surface is rapidly cooled and the muscles are hardened so thet they become motionless before they are absolutely dead. Thus, according to the method for instantly killing fish of the present invention, ATP consumption in the dying fish is less than that according to the conventional method of instantly killing fish by stabbing the hindbrain.

These conditions being effectively multiplied, fish treated according to the present invention are cleary more tasty than the fish treated by the conventional ice water method, and are even more tasty than the fish instantly killed with much labor and time by stabbing the hindbrain, at the same time such a taste can be kept for a longer time. Thus, the inventor has succeeded in realizing the most important feature of the method of treating fish by putting into practice an ideal method of treating fish superior to the conventional method.

In this connection when 10% by volume of a fish was frozen by a rapid cooling fluid at a temperature of $-20$ degrees C., and then the fish was cooled to the innermost portion by the fusion heat of the frozen portion and kept in the dipped state in the salt water at a temperature of $-2.5$ degrees C., the change of the K value of thus obtained fish was 2 to 3% a week after the fish was caught, which change is substantially near the case of a fish. On the contary, the change of K value of the fish instantly killed in the ice water at the temperature of 0 degree C. and kept cool according to the conventional method was as high as 20%.

If a fish is thrown into the rapid cooling fluid at a temperature of about $-20$ degrees C., it is hardened in a moment (about in a second) and the eyeballs and the fish body surface turn white. In this state, the muscles are hardened by cooling the fish body surface and the fish cannot move at all. A fish is dipped in the rapid cooling fluid for a few minutes or a few ten minutes (the smaller the size of the fish is, the shorter the dipping time is), and immediately after that the fish, which is dead and frozen in the body surface, is taken out of the rapid cooling fluid and dipped in the ice water at a temperature of about 0 degree C. or put into a cold maintenance chamber, whereby the frozen surface portion melts. As the result, the eyeballs and the body surface of the fish which has once turned white are brought back to a normal and fresh state like a fish again after a few minutes or a few ten minutes.

In this case, bleeding from the gills or fish body surface are not observed at all. Therefore, even the rapid cooling fluid used in treating a lot of fish is only slightly polluted and can be used repeatedly for a long time.

Furthermore, the rapid cooling fluid for cooling the fish is at a rather low temperature. However, since only the body surface of the fish is required to be cooled, the cooling time is very short and the cooling energy quantity required for the heat exchange between the rapid cooling fluid and the fish body is also small, and therefore a small capacity freezer is satisfactory to cool the rapid cooling fluid.

Consequently, when the present invention is used on a fishing ship, most of the existing fish tanks are used for keeping the alerfy treated fish, and only a part of them is filled with rapid cooling fluid used in the first cooling step. Therefore, the method according to the present invention can be conveniently used on a fishing ship where, due to the restriction in space, a large-sized freezing apparatus can hardly cooling fluid can hardly be stored.

Further preferably, by using the method according to the present invention on a fishing ship, the fish caught can be treated still in the living and vigorous state and the most tasty fish can be obtained.

When the fish are dipped in high concentration salt water brine, especially in a calcium chloride, the body surface of the fish becomes salty or bitter and the commercial value of the fish is sometimes lowered. But according to the present invention, since the dipping time is very short, such a problem is not observed. Further, by using ice water consisting of fresh water ice and sea water for keeping the treated fish, the salt on the body surface of the fish is naturally washed out, and the salty taste can be removed in a manner similar to that in the conventional ice water method.

Furthermore, in comparison with the conventional ice water method where fish are thrown directly into the fish tank, according to the present invention, the inside of the fish's body can be cooled to the same temperature as that with ice water in a shorter time, and the amount of crushed ice required after the body surfaces of the fish are frozen can be reduced. This is because the body surfaces of the fish have been already cooled in the primary or instant cooling stage, and cooling energy (calories) that is less than the cooling energy (calories) of heat-exchange in the first cooling stage is required.

This is because, in the conventional ice water method using ice water at a temperature of about 0 degree C., since the fish are not instantly made to die from shock but rather die in agony, the fish struggle and consume a large amount of heat energy to generate heat, so the cooling energy of the crushed ice is used to meet the generated heat. Further, in the conventional ice water method, since the insides of the fish are not cooled soon, the heat generation at the time of the decomposition a portion of the fish by the coliform digestive enzyme cannot be controlled.

The coliform digestive enzyme is most active at a temperature near the temperature of the fish and becomes inactive at the lower temperature. Even a dead fish, unless cooled enough, generates heat by the action of the digestive enzyme, and thereby the temperature of the fish body rises, and so the digestive enzyme becomes more active, thus creating a damaging cycle.

It was reported that in the case of walleye pollacks, the fish bodies once cooled to about to 0 degree C. again reached as high a temperature as 15 degrres C. due to the heat generation by the action of the digestive enzyme.

Since the fish instantly killed and cooled according to the present invention can be rapidly cooled to a predetermined temperature including the innermost portion of the fish body in the secondary or storage stage, the digestive enzyme becomes inactive and heat generation by the action of the digestive enzyme can be controlled and a high degree freshness can be maintained for a long time.

When fish immediately after being caught are thrown into a rapid cooling tank containing a high concentration salt water brine at a temperature of about −20 degrees C. and dipped therein for several seconds to several ten seconds (the primary or instant cooling stage), only the surface layer of the fish is frozen. If the fish are dipped in the rapid cooling fluid for several minutes to several tens of minutes (dipping time being variable depending on the size the of fish) the freezing proceeds from the surface skin to the inner portion, and fish can be sufficiently cooled with much less cooling load, for example, with crushed ice in the subsequent cooling step.

In this case, the flesh near the surface layer of the fish is frozen once in the instant cooling stage. Since such freezing is rapid freezing by a highly heat-conductive rapid cooling fluid, ice crystals produced in the cells are very small and dense and are thawed immediately after being transferred to the cold storage tank, utilizing the latent heat of melting.

In a preferred example of the present invention, living fish are instantaneously killed by the rapid cooling and in addition, the body surfaces of the fish are frozen by the said rapid cooling fluid. The frozen surface portion cools the inner portion of the fish rapidly to a predetermined temperature on melting. In this case, the fusion heat of the frozen portion is rather large, therefore, the entire body of the fish can be cooled in a short time by freezing only a part of the fish's body.

If 20% by volume of a fish's body, the temperature of which is 20 degrees C., is frozen, the remaining 80% of the fish body can be cooled from 20 degrees C. to 0 degree C. by using the fusion heat of the frozen portion.

In practice, if the body surface of a fish is frozen the portion close to the frozen portion is also cooled to about 0 degree C. Therefore, by freezing about 10% by volume of a fish, the whole fish's body including the innermost portion can be cooled to about 0 degree C. by the fusion heat of the frozen portion.

In this case, since the temperature of the frozen surface portion of the fish is kept near the melting point of the fish body, that is, about −2.5 degrees C. + or −0.5 degrees C., the inner portion of the fish body can be effectively cooled from the whole surface portion in a short time.

Further, since the inner portion of the fish body is cooled by the fusion heat of the frozen portion of the fish body, it is not necessary to cool the fish after its surface portion is frozen, and the fish can be cooled to its innermost portion only by storing the fish in the cold maintenance tank.

Further, since only the surface portion of the fish is rapidly cooled and frozen, most of the flesh is still unfrozen, cell destruction is not caused by ice crystals, and problems caused by dripping during thawing such as hardening of the flesh and degradation of taste can be prevented.

What is claimed is:

1. A method for instantly killing and cooling fish which comprises a primary or instant cooling stage in which the fish are instantly killed by dipping them into a rapid cooling fluid at a temperature below 0 degree C. and at the same time the body surfaces of the fish are cooled to a temperature below that of the inner portion of the fish, and a secondary or storage stage at a temperature higher than the freezing point of the fish body in which, after the primary or instant cooling stage, the fish are kept cool in a temperature above the freezing point of the fish body and above that of the rapid cooling fluid.

2. An apparatus for instantly killing and cooling fish comprising a rapid cooling hopper means into which fish are to be introduced, a rapid cooling tank means for receiving fish from the rapid cooling hopper means and containing rapid cooling fluid for instantly cooling fish in a primary or instant cooling stage, a cold storage tank means for receiving fish from the rapid cooling tank means and for cooling fish in a secondary or storage stage, a separator means connected to the rapid cooling tank means for separating fish from the rapid cooling fluid, a discharge means for transferring fish and fluid from the rapid cooling tank means to the separator means, a cold tub means for holding rapid cooling fluid from the separator means, a return line means for transferring rapid cooling fluid from the cold tub means to the rapid cooling hopper means and/or the rapid cooling tank means, and a cooling means for cooling the rapid cooling fluid; wherein fish are rapidly cooled in the rapid cooling hopper means and the rapid cooling tank means, and then transferred to the cold storage tank means via the discharge means through the separator means.

3. A method as claimed in claim 1, in which the temperature of the rapid cooling fluid used in the primary or instant cooling stage is below −5 degrees C. and the fish are dipped in the rapid cooling fluid for more than 10 seconds.

4. A method as a claimed in claim 1, in which the temperature of the rapid cooling fluid used in the primary or instant cooling stage is below −10 degrees C. and the fish are dipped in the rapid cooling fluid for more than 1 second.

5. A method as claimed in claim 1, in which in the primary or instant cooling stage, by dipping the fish in the rapid cooling fluid the surface layers of the fish are frozen.

6. A method as claimed in claim 1, in which the fish are dipped into ice water in the secondary or storage stage.

7. A method as claimed in claim 1, in which the fish are stored in a cold storage tank in the secondary or storage stage.

8. An apparatus as claimed in claim 2, comprising a rapid cooling hopper, a rapid cooling tank connected with the rapid cooling hopper, a discharge means connected with the upper portion of the rapid cooling tank, a cold storage tank, a cold tub for containing a predetermined amount of rapid cooling fluid, a cooling means for cooling the rapid cooling fluid, and a transfer means for transferring the rapid cooling fluid to the rapid cooling hopper, so that the fish and the rapid cooling fluid are introduced into the rapid cooling hopper and then contained in the rapid cooling tank and cooled there, and the fish are discharged from the rapid cooling tank to the cold storage tank by the discharge means.

9. An apparatus as claimed in claim 2, in which the discharge means is a pipe, one end of the pipe being connected with the upper portion of the rapid cooling tank, a separator being connected with the other end of the pipe, so that the fish are transferred with the rapid cooling fluid to the separator, and the fish and the rapid cooling fluid are separated from each other by the separator and then the fish are discharged.

10. An apparatus as claimed in claim 2, in which the cold storage tank is a fish tank provided with a cold storage means, and the cold storage means cool the fish tank to a temperature which is higher than that of the rapid cooling fluid in the rapid cooling tank but lower than the atmospheric temperature.

11. An apparatus as claimed in claim 10, in which the fish tank is filled with ice water obtained by mixing crushed ice with sea water.

12. An apparatus as claimed in claim 8, in which the transfer means is provided with a feed pump for introducing the rapid cooling fluid from the rapid cooling tank into the rapid cooling hopper.

13. An apparatus as claimed in claim 2, in which the cooling means for cooling the rapid cooling fluid is ice obtained by cooling and freezing the rapid cooling fluid.

14. An apparatus as claimed in claim 2, in which the rapid cooling hopper is provided with an overflow opening, and the overflow opening is connected with the cold tub.

15. An apparatus as claimed in claim 2, in which the discharge side of a return pump is connected with the rapid cooling tank so that the rapid cooling fluid introduced under pressure into the rapid cooling tank makes the fish discharge out of the rapid cooling tank together with the rapid cooling fluid.

* * * * *